United States Patent [19]
de Rouffignac et al.

[11] Patent Number: 5,997,214
[45] Date of Patent: Dec. 7, 1999

[54] REMEDIATION METHOD

[75] Inventors: Eric de Rouffignac; Harold J. Vinegar, both of Houston, Tex.

[73] Assignee: Shell Oil Company, Houston, Tex.

[21] Appl. No.: 09/089,904

[22] Filed: Jun. 3, 1998

Related U.S. Application Data

[60] Provisional application No. 60/048,744, Jun. 5, 1997, and provisional application No. 60/061,520, Oct. 9, 1997.

[51] Int. Cl.$^6$ ................................. B09B 3/00; E02D 3/11
[52] U.S. Cl. ........................... 405/128; 405/131; 588/252
[58] Field of Search ..................................... 405/131, 130, 405/128, 129, 258; 588/252; 166/248, 265

[56] References Cited

U.S. PATENT DOCUMENTS

| | | | |
|---|---|---|---|
| 2,902,270 | 9/1959 | Salomonsson et al. | 262/3 |
| 3,181,613 | 5/1965 | Krueger | 166/38 |
| 4,973,811 | 11/1990 | Bass | 219/10.57 |
| 5,060,287 | 10/1991 | Van Egmond | 392/301 |
| 5,076,727 | 12/1991 | Johnson et al. | 405/128 |
| 5,134,078 | 7/1992 | Sieksmeyer et al. | 405/128 X |
| 5,152,341 | 10/1992 | Kasevich | 166/248 |
| 5,190,405 | 3/1993 | Vinegar et al. | 405/128 |
| 5,193,934 | 3/1993 | Johnson et al. | 405/128 |
| 5,221,287 | 6/1993 | Marsden, Jr. et al. | 219/20 |
| 5,246,309 | 9/1993 | Hobby | 405/128 |
| 5,255,742 | 10/1993 | Mikus | 166/303 |
| 5,261,765 | 11/1993 | Nelson | 405/131 X |
| 5,271,693 | 12/1993 | Johnson et al. | 405/128 |
| 5,347,070 | 9/1994 | Heath et al. | 588/253 |
| 5,360,067 | 11/1994 | Meo, III | 166/256 |
| 5,370,477 | 12/1994 | Bunin et al. | 166/248 X |
| 5,389,267 | 2/1995 | Gorelick et al. | 405/128 X |
| 5,449,251 | 9/1995 | Daily et al. | 405/128 |

OTHER PUBLICATIONS

International Search Report dated Sep. 22, 1998.

*Primary Examiner*—Dennis L. Taylor

[57] ABSTRACT

A method is provided to remove volatile liquid contaminates from a contaminated volume of earth, the contaminated volume lying above a noncontaminated layer of earth, the method including the steps of: penetrating the contaminated volume with at least one wellbore so that a wellbore penetrates the contaminated volume and at least one wellbore penetrates the noncontaminated layer; applying heat from the wellbore within the noncontaminated layer to the noncontaminated layer until the temperature of a substantial portion of the noncontaminated layer that is contiguous with the contaminated layer is at least the boiling point temperature of contaminated liquids; and applying heat from the wellbore within the contaminated volume to the contaminated volume wherein the temperature of the contaminated volume rises to the boiling point of contaminated liquids after a substantial portion of the noncontaminated layer that is contiguous with the contaminated layer is about the boiling point of the contaminated liquids.

11 Claims, No Drawings

REMEDIATION METHOD

RELATED APPLICATIONS

This application claims priority to provisional application No. 60/061,520, filed on Oct. 9, 1997 also Ser. No. 60/048 744 filed Jun. 5, 1997.

FIELD OF THE INVENTION

The invention relates to an in situ thermal desorption process for remediation of volatile contaminates.

BACKGROUND TO THE INVENTION

Thermal desorption methods to remove volatile contaminates from soils in situ are suggested in, for example, U.S. Pat. Nos. 4,973,811, 5,076,727, 5,152,341, 5,190,405, 5,193,934, 5,221,827, and 5,271,693. Methods of applying heat include microwave and radio frequency electrical power along with resistance heating between electrodes; injection of hot gases, and conduction of electricity through the soil. Conductive heat transfer from heat injection wells are suggested in, for example, U.S. Pat. Nos. 5,190,405 and 5,271,693. U.S. Pat. No. 5,271,693 suggests a heater well through which vapors are extracted from the formation.

These methods generally rely on maintenance of a low pressure at the surface or at a vapor extraction wellbore to control movement of contaminates from their initial position to a point where they can be recovered. Because of the relatively large pressure differential needed to cause flow of a significant flux of vapors through soil, only low heating rates can be applied by these methods or pressure will be created at the point where vaporized contaminates exist sufficient to cause the vaporized contaminates to move away from the initially contaminated soil in directions other than the direction in which removal of contaminates is provided for. It is therefore an object of the present invention to provide a method to remove contaminates from a contaminated soil by in situ heating wherein the vaporized contaminants do not move downward from the contaminated soil.

SUMMARY OF THE INVENTION

This and other objects are accomplished by a method to remove volatile liquid contaminates from a contaminated volume of earth, the contaminated volume lying above a noncontaminated layer of earth, the method comprising the steps of: penetrating the contaminated volume with at least one wellbore so that a wellbore penetrates the contaminated volume and at least one wellbore penetrates the noncontaminated layer; applying heat from the wellbore within the noncontaminated layer to the noncontaminated layer until the temperature of a substantial portion of the noncontaminated layer that is contiguous with the contaminated layer is at least the boiling point temperature of contaminated liquids; and applying heat from the wellbore within the contaminated volume to the contaminated volume wherein the temperature of the contaminated volume rises to the boiling point of contaminated liquids after a substantial portion of the noncontaminated layer that is contiguous with the contaminated layer is about the boiling point of the contaminated liquids.

The wellbores preferably vertically penetrate the contaminated soil and are perforated to provide for removal of vapors generated within the contaminated soil through the wellbores. It has been surprisingly found that when a layer of soil below the contaminated volume is heated to prevent condensation of contaminates below the contaminated soil, when the contaminates in the contaminated volume are vaporized, they do not move downward, but are forced toward the surface or perforated wellbores for recovery.

DESCRIPTION OF A PREFERRED EMBODIMENT

This invention addresses a problem of containment of contaminants that are vaporized in thermal remediation processes. It has been found that heating a layer of soil below the contamination prior to elevating the temperature of the soil to be decontaminated to about the boiling point of liquids in the contaminated soil, effectively blocks movement of vapors downward.

The volatile contaminates which may be removed from contaminated soils by the method of the present invention are a wide variety of contaminates. Contaminates that are typically considered to be volatile, such as gasoline, can be remediated by the present invention, but much heavier hydrocarbons and higher temperature boiling point materials can also be volatilized and removed by the present invention. For example, polyclorinated biphenyls ("PCBs"), mercury, and heavy oils produced by manufactured gas plants can be removed as vapors by the present invention. Even where temperatures do not reach the normal boiling points of these materials, water vapor will be generated and even a limited vapor pressure of the contaminate will result in removal of the contaminate with sufficient amounts of steam.

The wellbores of the present invention can be cased and cemented wellbores such as are utilized in the oil industry, but such elaborate wells may not be justified in most applications. A shallow casing to ensure that clean overburden is not contaminated by vapors being removed from the formation may be provided. When the wellbore is cased to the bottom of the borehole, it may be perforated according to methods well known in the oil industry. Wellbores may be vertical, horizontal, or angled between vertical and horizontal.

Heat can be imparted to the contaminated volume, and preferably to the layer of noncontaminated soil below the volume of contaminated soil, by conduction from the wellbore. Wellbore heaters useful for heating the wellbore to provide heat for conduction into the formation are known. For example, gas fired wellbore heaters are taught in U.S. Pat. Nos. 2,902,270, and 3,181,613, incorporated herein by reference. Electrical wellbore heaters are disclosed in, for example, U.S. Pat. No. 5,060,287, incorporated herein by reference. A preferred gas fired wellbore heater is disclosed in, for example, U.S. Pat. No. 5,255,742, incorporated herein by reference.

Heat is applied to the contaminated volume by conduction, and is preferably applied from a wellbore which also serves as a source of suction to remove contaminate containing vapors from the wellbore. In this preferred embodiment, vaporized contaminates are therefore transported from the formation directly to the wellbore for recovery without the possibility that they are transported to cooler soil where the contaminates could condense, causing an increased concentration of contaminates where condensation occurs.

The noncontaminated layer can optionally be heated by injection of hot fluids such as steam, combustion gases, or heated nitrogen.

As heat is applied to the soil, little generally happens until vapor is generated by the heat. If the contaminates are light volatile components (normal boiling points less than the boiling point of water), such as gasoline, the vapors initially generated will contain relatively high concentrations of contaminates. Heavier contaminates will be vaporized as steam is generated from water present in the soil due to the vapor pressure of the heavy contaminates in the steam. The lower the pressure can be maintained in the contaminated soil, the higher the concentration of the heavy contaminants in the vapor will be, thus, less heat will need to be injected to vaporize the contaminates. If the contaminates are immiscible with water, then steam will be generated at about the boiling point of water at the pressure within the soil at that point. Contaminated soil can be heated prior to the noncontaminated layer reaching a temperature of the boiling point of contaminated liquids, but the temperature of the contaminated volume should remain below the boiling point of the liquids in the contaminated zone in order to prevent vaporization (and therefore movement) of contaminates prior to the layer of noncontaminated soil reaching such a temperature.

Wells according to the present invention can be horizontal or vertical wells. Vertical wells preferably extend through the contaminated volume and into a noncontaminated layer below the contaminated volume. The depth below the contaminated volume is selected considering the distance between the wells. Typically, about one third of the distance between the wells will provide sufficient wellbore below the contaminates to provide for heat injection to the noncontaminated layer. In a preferred embodiment of the present invention, the wells provide a conduit for removing vaporized material from the formation, and as a location for the heaters. A negative pressure is preferably maintained within the casing to evacuate the contaminants from the soil. Two heater elements can be provided in each casing, one within the contaminated volume and one within the layer below the contaminated volume. Heater elements can provide heat through the contaminated volume and can optionally extend into the noncontaminated layer below the contaminated volume. Optionally, a second heater element can provide heat in the portion of the wellbore below the contaminated volume. One heater element could be provided if the element is designed to provide greater heat release (typically about 50% more heat per unit length) below the contaminated volume so that a temperature of about the boiling point of the liquids in the layer below the contaminated volume is reached in the contaminated volume prior to such a temperature being reached in the contaminated volume. This may be accomplished by providing a heater element having different element diameters. For example, a nicrome wire heating element could be used, the element having a 0.128 inch diameter in the contaminated zone, and a 0.102 inch diameter in the noncontaminated zone. It is preferred that separate heaters be provided because providing such difference in heat flux throughout the remediation would not be energy efficient, and could significantly limit heat flux into the contaminated region because of casing temperature limitations. Also, when separate heaters are utilized, the heater in the layer below the contaminated zone could be turned on first, and then turned off at least a portion of the time the other heater is utilized to reduce energy costs. The casing could be insulated in the overburden, or could be equipped with additional heaters to ensure that contaminants from the vapors do not condense in the casing.

Electrical resistance heaters are discussed, but other heater types could also be provided. Electrical heaters are convenient to control and because they do not require flowlines within the casing, leaving more room for flow of vapors from the contaminated soil.

Additional wellbores equipped to insert heat and to remove vapors are preferably provided in soil surrounding the contaminated volume in order to ensure that contaminates do not move away from the initially contaminated volume.

The contaminated volume is shown as underneath an overburden, but if the soil is to be heated to the surface, insulation can be provided above the surface. Further, if the contaminated volume extends to near the surface, it could be beneficial to provide a vapor seal over the surface to prevent excessive amounts of air from being pulled into the contaminated volume and to prevent escape of contaminated vapors to the atmosphere. If the contaminated volume extends to the surface, surface heaters could be provided apply heat from the surface.

Vapors are preferably removed through wellbores extending into the contaminated volume, and these vapors can then be treated to remove contaminants by methods known in the art. For example, thermal oxidizers can be provided to oxidize the contaminates, and then the remaining vapor stream could be passed through carbon beds to collect remaining contaminants and/or the oxidation products of the contaminants. A blower will generally be provided to maintain a low absolute pressure within the wellbore and formation. Lower pressures are beneficial because lower pressures decrease the temperatures at which water and contaminates are vaporized in the contaminated soil. Subatomspheric pressures also prevent vapors from escaping to the atmosphere.

Patterns of heater and suction wells are preferably provided to provide uniform heat to the contaminates soil, and reduce time required to finish remediation of the contaminated soil. Triangular or square patterns may conveniently be provided. Distance between wells in square or triangular patterns can be, for example, 3 to 20 feet. This relatively close spacing is preferable because heat transfer by conduction through the soil is relatively slow.

In a similar manner, if a layer of noncontaminated soil lies above the contaminated volume, extra heat could be applied above the contaminated volume as well as below the contaminated volume. This extra heat can be applied from a separate heater or from heating elements designed to provide greater heat release in the layer of noncontaminated soil above the contaminated soil.

The pattern of heater-suction wells preferably extends past the periphery of the contaminated soil. Like the layer below the contaminated volume, this ring surrounding the periphery of the contaminated volume is preferably heated to about the boiling point of liquids in that ring prior to heating the contaminated volume to above the boiling point of the liquids in the contaminated volume. Alternatively, the contamination could be laterally contained by barriers such as metal sheeling driven into the ground or barriers of cement or slurry poured in narrow trenches.

EXAMPLE

The importance of heating a contaminated soil from below the contaminated soil is demonstrated in a sand-packed glass column, with wet sand loaded in a clean bottom layer, and a top layer that contains varying amounts of oil of wintergreen (methyl salicylate, density of 1.35 gm/cm) to model a contaminate such as a PCB. The methyl salicylate is more dense than water and tends to sink through the water. The apparatus consisted of a three inch inside diameter, thirty six inch long glass column. A vacuum could be drawn on the top. A slight vacuum (about one inch of water) was maintained at the top of the column in order to remove vaporized oil of wintergreen. Heat was applied by wrapping flexible heaters around the outside of the glass, wrapping one and one quarter inch thick insulation around the heaters. The heaters used were 17 ohm resistance heaters, 17 inches wide by 12 inches tall, and are available from Minco Products Inc., of Houston, Tex. One heater was wrapped around the section containing the oil of wintergreen, and another heater was wrapped around the bottom section of the column. In the examples of the present invention, the bottom heater was turned on first, and the top heater was turned on after the temperature of the clean sand reached the boiling point of the oil of wintergreen. In comparative examples, C1–C3, the bottom heater was not used. In each example, clean sand was placed in the bottom portion of the glass column and another portion of sand was mixed with oil of wintergreen and placed on top of the clean sand. Heating was continued until the temperature of the sand reached about 480° F., the column was then cooled, and the concentration of oil of wintergreen in the sand at the top and bottom determined.

The Table summarizes the results of the examples 1–10 and comparative examples C1–C3. The initial oil content is the percent weight oil of wintergreen in the top eight inches of the column. The final top oil concentration is the oil content of a sample from the top section of the column after the top section was heated to about 480° F., and then cooled. The final oil content of the bottom of the column is the maximum oil concentration found in the bottom section of the column after the column had been heated and then cooled.

In each of the runs, the temperature within the column rose steadily until the boiling point of water was reached, and then remained constant until the water was vaporized. The temperature then rose steadily again until the boiling point of the oil of wintergreen was reached, and then remained constant until the oil of wintergreen was essentially vaporized, and then rising again.

TABLE

| EXAMPLE NO. | INITIAL OIL ppm Wt. | FINAL TOP OIL CONT. ppm Wt. | FINAL BOTTOM OIL CONT. ppm Wt. |
|---|---|---|---|
| 1 | 20,000 | 0 | 0 |
| 2 | 39,900 | 10 | 10 |
| 3 | 10,000 | 10 | 0 |
| C1 | 20,000 | 330 | 200 |
| C2 | 29,900 | 0 | 3,230 |
| C3 | 39,800 | 20 | 8,940 |

In the comparative examples C1, C2, and C3, the higher the initial oil concentration in the top section, the more contaminate condenses into the lower clean sand. In the examples where the bottom section is heated first, (examples 1, 2, and 3) virtually no oil condenses in the lower clean sand.

We claim:

1. A method to remove volatile liquid contaminates from a contaminated volume of earth, the contaminated volume lying above a noncontaminated layer of earth, the method comprising the steps of:

penetrating the contaminated volume with at least one wellbore so that a wellbore penetrates the contaminated volume and at least one wellbore penetrates the noncontaminated layer;

applying heat from the wellbore within the noncontaminated layer to the noncontaminated layer until the temperature of a substantial portion of the noncontaminated layer that is contiguous with the contaminated layer is at least the boiling point temperature of contaminated liquids; and applying heat from the wellbore within the contaminated volume to the contaminated volume wherein the temperature of the contaminated volume rises to the boiling point of contaminated liquids after a substantial portion of the noncontaminated layer that is contiguous with the contaminated layer is about the boiling point of the contaminated liquids.

2. The method of claim 1 further comprising the step of removing vaporized contaminates from the contaminated volume through at least one suction wellbore wherein a subatmospheric pressure is maintained within the suction wellbore.

3. The method of claim 2 wherein the suction wellbore is also a wellbore from which heat is applied to the contaminated volume.

4. The method of claim 1 wherein at least one wellbore penetrates the contaminated volume and extends from the contaminated volume to the noncontaminated layer.

5. The method of claim 3 wherein a pattern of suction-heater wellbores are provided.

6. The method of claim 5 wherein the wellbores within the pattern are separated by about 3 to about 20 feet.

7. The method of claim 1 wherein the at least one wellbore penetrating the noncontaminated layer is an essentially horizontal wellbore.

8. The method of claim 1 wherein the at least one wellbore penetrating the noncontaminated layer is an essentially vertical wellbore which also penetrated the contaminated volume.

9. The method of claim 1 wherein heat is applied to the noncontaminated layer from the wellbore within the noncontaminated layer.

10. The method of claim 1 wherein the contaminated volume is below noncontaminated earth, and further comprising the step of rising the temperature of the noncontaminated earth above the contaminated volume to a temperature that is above the normal boiling point of the contaminated liquids prior to heating the contaminated volume to the normal boiling point of the contaminated liquids.

11. The method of claim 8 wherein heat is applied to the contaminated volume and the noncontaminated layer from an electrical heating element, the electrical heating element extending through the wellbore within the contaminated volume and into the wellbore within the noncontaminated layer, the electrical heating element being a wire having a greater diameter within the contaminated volume than the noncontaminated layer.

* * * * *